(12) United States Patent
Gelbord et al.

(10) Patent No.: US 7,614,086 B2
(45) Date of Patent: Nov. 3, 2009

(54) MONITORING APPARATUS, COMPUTER PROGRAM AND NETWORK FOR SECURE DATA STORAGE

(75) Inventors: Boaz Simon Gelbord, Amsterdam (NL); Gerrit Roelofsen, Leiden (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 636 days.

(21) Appl. No.: 10/472,867

(22) PCT Filed: Mar. 19, 2002

(86) PCT No.: PCT/EP02/03235

§ 371 (c)(1),
(2), (4) Date: Mar. 19, 2004

(87) PCT Pub. No.: WO02/078340

PCT Pub. Date: Oct. 3, 2002

(65) Prior Publication Data

US 2004/0158718 A1 Aug. 12, 2004

(30) Foreign Application Priority Data

Mar. 27, 2001 (EP) .................. 01201136
Oct. 22, 2001 (EP) .................. 01203969

(51) Int. Cl.
 *G06F 7/04* (2006.01)
(52) U.S. Cl. ....................... 726/26; 713/176
(58) Field of Classification Search ............ 713/176; 726/26

See application file for complete search history.

(56) References Cited

U.S. PATENT DOCUMENTS

| 6,016,510 | A | * | 1/2000 | Quattromani et al. | ........ 709/233 |
| 6,085,152 | A | * | 7/2000 | Doerfel | ................... 702/3 |
| 6,173,068 | B1 | * | 1/2001 | Prokoski | ................ 382/115 |
| 6,208,379 | B1 | * | 3/2001 | Oya et al. | ............ 348/211.11 |
| 6,456,985 | B1 | * | 9/2002 | Ohtsuka | ................. 705/51 |

(Continued)

FOREIGN PATENT DOCUMENTS

GB    2 343 049    4/2000

(Continued)

OTHER PUBLICATIONS

International Search Report also submitted.

*Primary Examiner*—Kimyen Vu
*Assistant Examiner*—Yogesh Paliwal
(74) *Attorney, Agent, or Firm*—Michaelson & Associates; Peter L. Michaelson

(57) ABSTRACT

A monitoring apparatus, a computer program and a network are disclosed for monitoring a representation. The representation comprises a first data string. Subsequently, two or more output strings, based on the first data string, are generated by the monitoring apparatus such that the representative can not be reconstructed from just any of the output strings. The output strings are stored at separate storage locations. Each of the locations has different access rights from the other such that a party, authorized to solely access one such location and retrieve the single output string stored there, is unable to access the other location and retrieve the corresponding output string stored there. Consequently, that party, from just the single output string which it can access and retrieve, is unable to reconstruct the entire representation.

30 Claims, 2 Drawing Sheets

U.S. PATENT DOCUMENTS

| | | | |
|---|---|---|---|
| 6,842,540 B1 * | 1/2005 | Okayama et al. | 382/246 |
| 6,931,534 B1 * | 8/2005 | Jandel et al. | 713/176 |
| 2001/0029584 A1 | 10/2001 | Van De Haar | |
| 2002/0095490 A1 * | 7/2002 | Barker et al. | 709/224 |

FOREIGN PATENT DOCUMENTS

| | | |
|---|---|---|
| JP | 2000195168 | 7/2000 |
| WO | WO 00/45296 | 8/2000 |
| WO | WO 01/22735 | 3/2001 |

* cited by examiner

MONITORING APPARATUS, COMPUTER PROGRAM AND NETWORK FOR SECURE DATA STORAGE

BACKGROUND

1. Field of the Invention

The invention relates to a monitoring apparatus, a computer program and a network for secure storage of data.

2. Description of the Prior Art

The growing societal demand for privacy is on a collision course with the increased need for surveillance such as, e.g., camera surveillance, arising from growing crime and civil disputes. As an example, it happens more and more frequent that specific areas, such as, e.g., main city squares, airports or stadiums hosting sports events or rock concerts, need to be watched because of rising crime, expected troubles with unknown groups of people or more general security considerations. On the other hand, the privacy of individuals has become a fundamental right of people. Camera surveillance will obviously be in conflict with the right of privacy and will therefore encounter strong opposition from privacy advocates since it can be seen as encroaching on the rule of law abiding citizens to conduct their affairs without being watched.

From the above, it can be concluded that there is a need to avoid or soften this collision between security and privacy considerations by providing a monitoring apparatus which can monitor events while still preserving the privacy of those being filmed. State of the art closed circuit television (CCTV) cameras and other digital surveillance systems do not provide a solution to this problem.

SUMMARY

It is an aim of the invention to improve the existing surveillance apparatus in such a way that the modern day requirements put on both security and privacy are met. This result can be achieved by providing a monitoring apparatus that monitors representations of objects, such as, for example, images of people present in a specific area, and decomposing the recorded image. A representation of an object might be identical to the object in its entirety, but can refer to a characteristic part, such as the face of a person, of the object as well. In a preferred embodiment, the decomposed recorded image can only be viewed by reconstructing the decomposed parts of the image if a number of different parties consent to do so. Those parties could include the police, a privacy advocacy group, and a party that is primarily responsible for that specific area.

Criteria for selection of the parties can, e.g., include the requirement that at least one of the parties has a high degree of independency, i.e., is not involved in the situation whatsoever.

In a preferred embodiment of the invention, such a monitoring apparatus generates from a first data string, representing the image, two or more output strings. There are several methods by which one can generate two or more output strings that, in combination, provide the first data string once again. In an exemplary embodiment dealing with, e.g., three output strings, the first two of the three output strings is generated using random means such as, e.g., measurements from an internal clock or thermal measurements. The third output string is then chosen so that the binary addition modulo 2 of the three output strings yields the first data string. The output strings can be transmitted to separate storage locations. The first data string and the two or more output strings can be combined at or near the monitoring apparatus in order to obtain an additional output string.

The monitoring apparatus can be a digital camera or other data source having digital data strings as an output. In a variant, the monitoring apparatus is an analog camera equipped with an analog-digital conversion module.

The output strings and/or additional output strings can be stored in separate locations. The term "stored" here refers to having the data available in any possible manner such as registration of the location of the data, saving the data on a data carrier, knowing the whereabouts of the data somewhere in a network etc.

Moreover, it is noted that separate locations not necessarily refers to physical separation but also comprises, e.g., different memory areas in a single data memory, e.g., a hard disc. Preferably, the separate locations are not located in the neighborhood of the camera. For this purpose, the monitoring apparatus can be equipped with network communication means to enable transmission of the output strings and/or additional output strings to these separate storage locations over a network. In an embodiment, the strings are encrypted by encryption means at the monitoring apparatus before they are sent over the network, using, e.g., encryption keys. Moreover, state of the art compression techniques can be applied to the various output strings before they are sent to the specific storage locations.

In a variant, at least one of the storage locations can be situated in or near the monitoring apparatus. It can, e.g., be that all but one storage locations are situated outside the neighborhood of the monitoring apparatus. This provides the advantage that in the case that all (minus one) output strings which are stored at a certain distance and therefore have to be transported over that distance, could be intercepted during that data transport, the output string that is stored at or near the camera can not be intercepted. As a result, the image taken by the monitoring apparatus cannot be reconstructed even if all strings transmitted over the network have been intercepted. In another variant, all storage locations might be situated in or near the monitoring apparatus. Storage within the monitoring apparatus can be obtained in various kinds of known data memories, like tapes, hard disk, CD, DVD, etc.

Compression of the data strings can be advantageously applied in this variant as well.

In order to achieve the balance needed between security and privacy considerations as described above, the storage locations containing the various output strings are preferably not directly available to all the parties concerned. For this purpose, assessment means are provided to assess the access rights of the parties to a particular storage location storing at least one of the various output strings, such as, e.g., a personal identification number (PIN) or password. In an embodiment of the invention, all the various output strings are needed to reconstruct the image whereas the parties concerned only have access rights to just a single storage location containing one output string. If a situation arises where one of the parties concerned or a third party not having access rights themselves wants to reconstruct the image as taken by the monitoring apparatus, all parties having access rights need to consent to reconstruct the image(s). Such a situation might, e.g., be theft in a shop, riots in a stadium or fire at the airport.

In a variant, not all output strings are needed to reconstruct the image but redundant output strings are generated at the monitoring apparatus by selection means to select selected output strings from the two or more output strings. Registration means such as the generation of strings using techniques in such a way that certain predefined subsets allow for the reconstruction of the image can register which strings are needed to reconstruct the image, by, e.g., assigning a code to an output string.

This can have advantages if, for example, one wants to give certain parties greater authority in reconstructing the original data string than other parties.

In a variant, of the invention the monitoring apparatus is equipped with an event trigger for event detection. This event trigger can cause the generation of output strings and transmission of these output strings to the separate storage locations to substantially take place only if, e.g., a change of a substantially steady image is detected. Such a change might be the result of the movement of a person or an object in an otherwise "movement-free" area. An event trigger can, e.g., be based on well-known image-recognition techniques. An example is a camera installed near an emergency exit to a bank which begins recording when it detects that someone is passing through the exit. This detection would take place through an event detector, which can take the form of image recognition software or of a physical detector such as an infrared detector. Such event detectors alert the camera when the reference event has occurred. The presence of an event trigger at or near the monitoring apparatus has the advantage that less irrelevant data, i.e., the various output strings generated from the first data string, are stored at the separate locations.

In an embodiment of the invention, the monitoring apparatus is equipped with watermarking means in order to assign watermarks to the first data strings and/or output strings and/or additional output strings, e.g., by insertion of a watermark string in the respective strings. These watermarks can comprise an identifier referring to its origin, i.e., the monitoring apparatus. Moreover the watermark can comprise a timestamp referring to the timeframe in which the first data string was recorded or in which the two or more output strings and/or additional output strings were recorded. Also, the storage location for the specific output string can be part of the watermark, e.g., a download watermark.

It is noted that the previous embodiments or variants of the previous embodiments of the invention can be combined.

DESCRIPTION

For the purpose of teaching the invention, preferred embodiments of the method and devices of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

Figure 1:
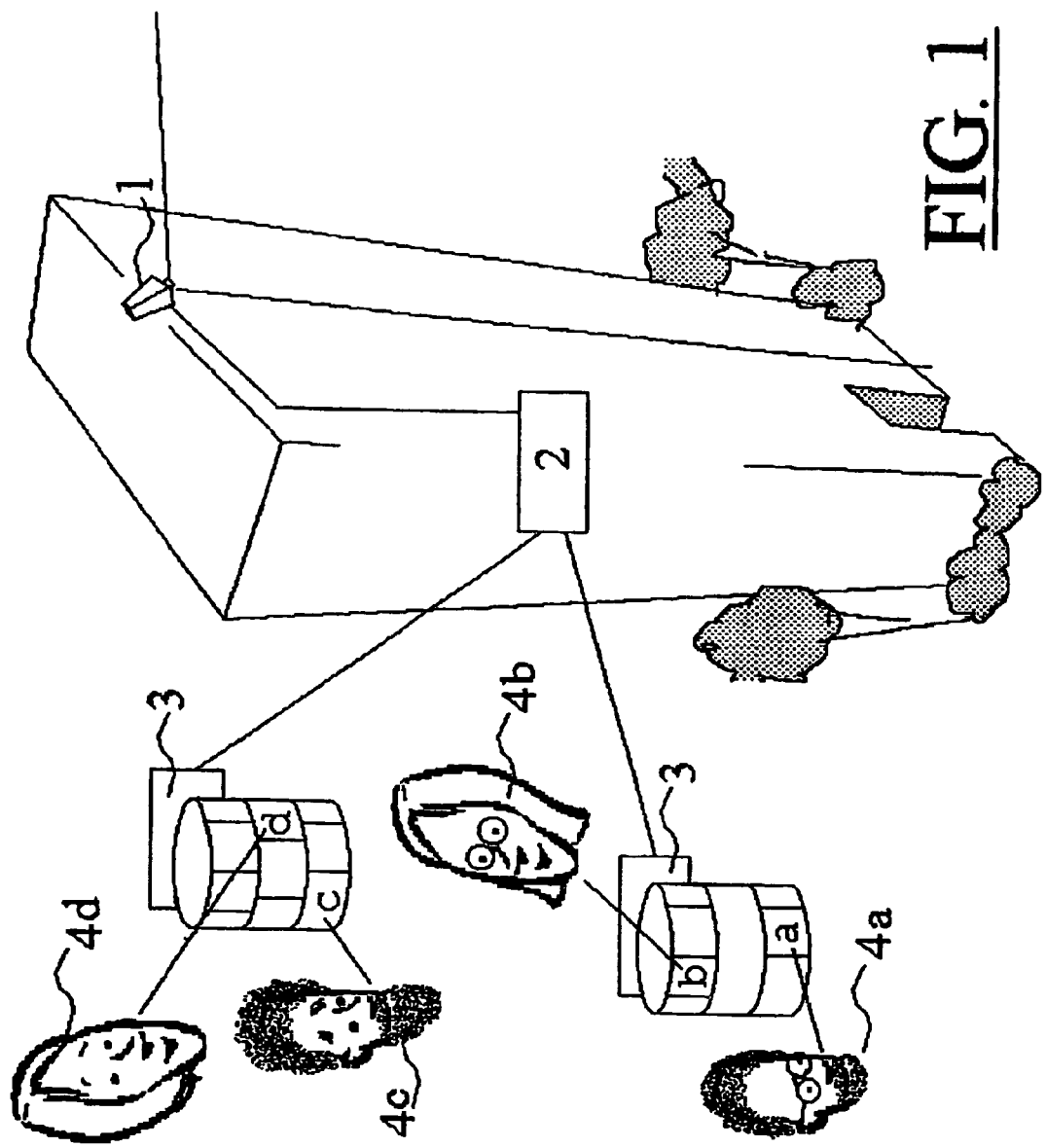
FIG. 1 shows a security concept according to an embodiment of the invention.

In FIG. 1, an embodiment of the invention is shown illustrating the employed security system. The system comprises a monitoring apparatus 1, e.g., a data source such as a digital camera connected to a processor 2. The processor 2 can be, but is not necessarily, an integral part of the monitoring apparatus 1. The processor 2 in an embodiment generates at least two output strings from a first data string provided by the monitoring apparatus 1 and transmits these output strings to separate storage locations 3. Those storage locations 3 are accessible by different parties 4$a$ ... d, each of them having accession rights for, e.g., only one storage location, by means of an individual identifier/password combination, stored in the storage system 3. The storage locations may be physically located within one storage system or within physically separated storage systems. In an embodiment of the invention, one party has the rights to access one de-compiled file and upload it to processor 2 when desired.

In that way re-construction (re-compilation) of (a replica of) the original (image) file can be achieved after several parties have accessed their own de-compiled files and uploaded them to the processor 2. In processor 2, uploaded files are combined, resulting in a reconstruction of the original.

Figure 2:
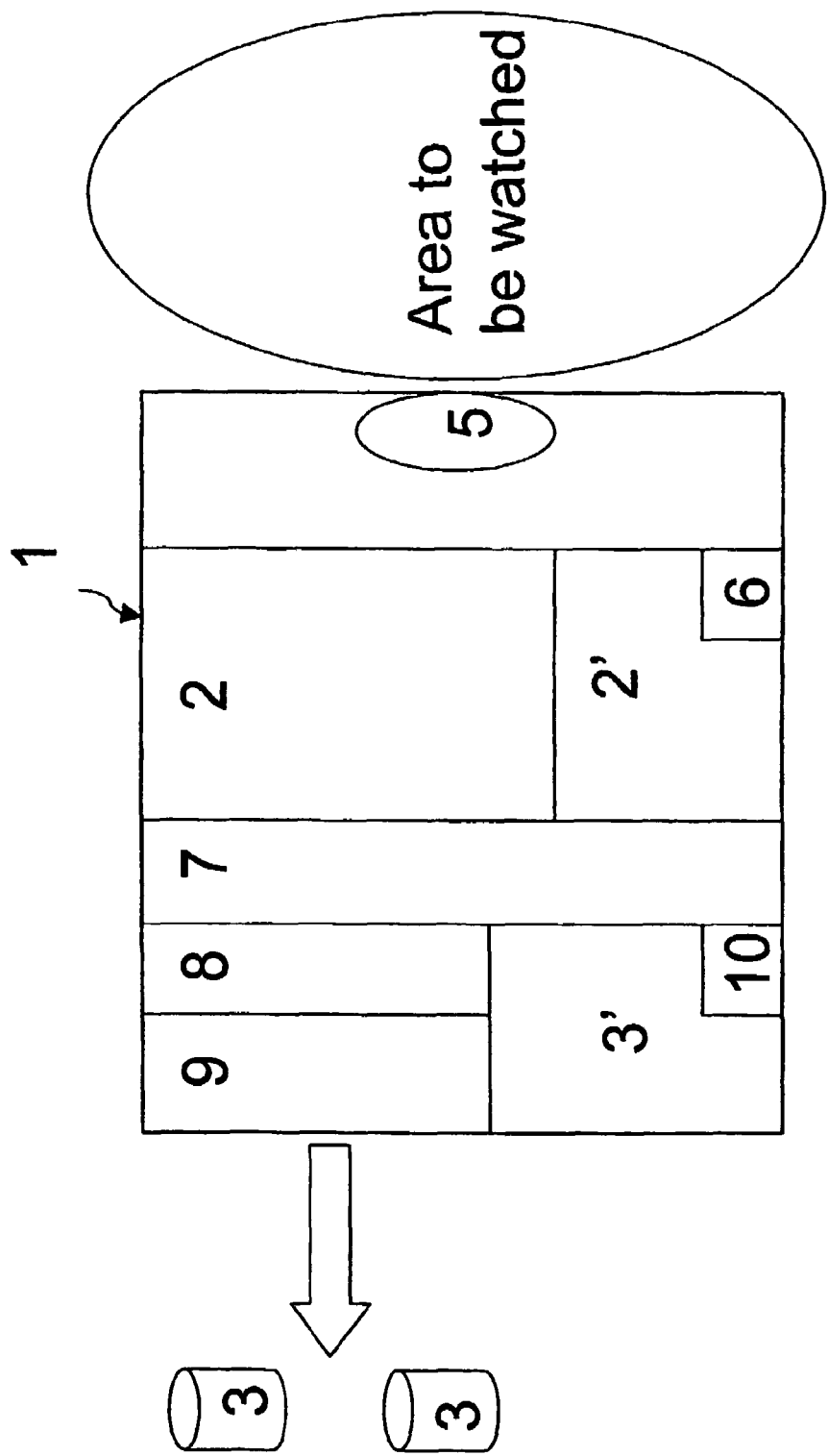
FIG. 2 shows a monitoring apparatus according to an embodiment of the invention.

In FIG. 2, an embodiment of the monitoring apparatus 1 according to the invention is shown, identifying several modules 2-10 that in this preferred embodiment are part of a digital camera. It is noted that any kind of data source can be employed, e.g., also an analog camera the output of which can be digitized by an analog-digital conversion module. In the embodiment as shows in FIG. 2, the processor 2 is an integral part of the camera.

The camera 1 monitors an area to be watched. Such areas might be, e.g., main city squares, shopping malls, airports or stadiums hosting sports events or rock concerts. The camera 1 is equipped with event triggering means that only activate the processor 2 of the camera 1 if "something happens". One might, e.g., think of a camera 1 monitoring generally speaking, a "movement free" area with, the event triggering any kind of movement in this area. Such event triggers can be implemented either using well-known image recognition techniques or using physical means such as infrared detection.

The camera 1 provides a first data string which is generated as a consequence of the monitoring of representation, such as images of person entering the area to be watched. The first data string is fed to the processor 2 which generates at least two output strings from the first data string and is suited to generate additional output strings and watermark the strings as will be explained in more detailed now.

Let the following parameters be defined as:

t Number of parties $P\_1, \ldots, P\_t$ Parties receiving the shared images

C Camera C $K\_1, \ldots, K\_t$ Secret keys of the parties 1 to t $T\_C$ Time interval at camera C $DK\_i$ Derived key for party i $D\_\{T\_C\}$ Complete image for camera C at time T $D\_\{\{T\_C\}\_i\}$ Un-watermarked shares, i from 1 to t $M\_\{\{T\_C\}\_i\}$ Watermarked shares, i from 1 to t The various parties whose consent will be needed to reconstruct the representation are denoted as $P\_1, P\_2, \ldots, P\_t$. A particular camera 1 is denoted by C. The values that follow (such as keys and so forth) will all be taken to be indexed with respect to the camera C. This will be denoted by the subscript C.

When a particular location is to have a camera 1 C installed, the camera 1 is provided, in a tamper-resistant module, with the keys $K\_, K\_2, \ldots, K\_t$ of the parties $P\_1, \ldots, P\_t$, respectively. This can be done using PKI (public key infrastructure) for example, or otherwise can be done at the manufacturing stage itself.

The camera 1 will have a defined time interval that contains a predetermined number of data frames (or alternately a predetermined elapsed time). Let the time on the camera be defined as T_C. Thus, in this embodiment T_C=0 for the first frame, T_C=1 for the second, and so forth.

For each value of i, 1<=i<=t, the camera C (in fact processor 2) shall calculate the following key for the present value of T_C:

DK_i=Derived Key(P_i, T_C, C, (optionally-names of the parties P_1, ..., P_t)) (*)

This derived key can be obtained in numerous ways. In this particular embodiment a one-way hash function like SHA-1 will be used.

As well, each of the parties P_1, ..., P_t shall calculate (*) for its own value of i.

The camera 1 shall then transmit the current digital image, denoted D_{T_C} as follows. The image D_{T_C} will first be assigned a digital watermark by the processor 2, to obtain a new D_{T_C} containing a general watermark. The image D_{T_C} shall be divided into a number of t equal "portions", in the following manner. Regarding each D_{T_C} as a matrix over some ring (which depends on the resolution of the picture), the processor 2 shall assign arbitrary matrices D_{{T_C},i}, for i=1 to t−1, in an independent, arbitrary (random) manner. Then the last matrix D_{{T_C},t} shall be assigned in such a way such that:

D_{{T_C}_1}+D_{{T_C}_2}+ . . . +D_{{T_C}_t}}=D_{T_C}

Now, the processor 2 shall calculate a new image M_{{T_C}i} based on D_{{T_C}_i}, where M_{{T_C}−i} is equal to D_{{T_C}−i}, with a download digital watermark that contains the identifier of C, T_C, i, and the current date.

As well, the values of the other parties (those values in 1, ..., t not equal to i) may optionally be placed on the digital watermark.

The image (i.e. matrix) M_{{T_C}_i} is then sent to the party i by e.g. networking communication means 9, encrypted with K_i. In one embodiment, a hashed value of M_{{T_C}_i} is sent to all the parties 1 through t.

Now, suppose one of the parties wants to reconstruct the image. Since all the parties have a completely random image, none will be able to reconstruct the image without the cooperation of the other parties.

However, if the parties operate together, together they will be able to reconstruct the image by combining the constituent parts. In this embodiment, an uploading watermark is added to each share M_{T_C}i} before the re-composition begins. Each party can then verify if the share it is receiving from the other party is valid.

Below, the method according to the invention will be illustrated by a simplified example. In this example, watermarking and encryption of the strings are not shown.

Starting from an original data string produced by the camera:

01111000011110111111110001100111110000001101101110 ...

three independent random output strings are generated.

string a:
11010010001010111100011011101110000100010101100011 ...

string b:
11000001011100011011110110101000010100110100011001 ...

string c:
01110100111000011110010011101111100100011010100000 ...

According to an embodiment of the invention, those three output strings and the original data string are combined by calculating for each bit position the sum modulo 2 (indicated as "[+]") of the bit values of string a, string b and string c. For example, for bit position 1 (from the left) this is 0 [+] 1 [+] 1 [+] 0=0; for bit position 2 this is 1 [+] 1 [+] 1 [+] 1=0; for bit position 3 this is 1 [+] 0 [+] 0 [+] 1=0; for bit position 4 this is 1 [+] 1 [+] 0 [+] 1=1, etc.

This results in a fourth additional output string d as shown below:

string d:
00011111110000000110001111001110000100110110110100 ...

All (four) output strings a-d (generated from the first data string) are stored separately in storage locations 3 and/or 3'.

For retrieval of a (re-composed) replica of the first data string from the separately stored output strings a-d, those strings are combined by calculating for each bit position the sum modulo 2 ("[+]") of the four bit values of the individual output strings, string a:
11010010001010111100011011101110000100010101011 ...

string b:
11000001011100011011110110101000010100110100011001 ...

string c:
01110100111000011110010011101111100100011010100101 ...

string d:
00011111110000000110001111001110000100110110110100 ...

resulting in the replica string:
01111000011110111111110001100111110000001101101110 ...

which is identical to the first data string.

Expanding this example with watermarking the first data string by the processor 2 as well as the output strings strings, results into the following.

Again, the camera string is:
01111000011110111111110001100111110000001101101110 ...

Watermarking with a (in this case very simple 6-bits watermark header string "000000") results into:
00000001111000011110111111110001100111110000001101101110 ...

Firstly, the processor 2 generates three random output strings:

string a:
11010010001010111100011011101110000100010101100011 ...

string b:
01011100011011110110101000010100110100011001101101 ...

string c:
00011110010011101111100100010010101000001010011001 ...

After that processor 2 calculates output string 4 by summing modulo 2 bit-by-bit the watermarked camera string and the random output strings 1 to 3, resulting into:

string d:
10010001111010111011101000010001110111010101
01 . . .

Next, the output strings are provided with individual (download) watermark headers "000001", "000010", "1000011" and "000100" respectively:

a: 000001
11010010001010111100011011101110000100010101
10 . . .

b: 000010
01011100011011110110101000010100110100011001
01 . . .

c: 000011
00011110010011101111001000110101000001010010
10 . . .

d: 000100
10010001111010111011101000010001110111010101
01 . . .

These output strings may be encrypted in the processor 2 or in a separate encryption module 8 and transmitted to separate storage locations 3 and/or 3', where they are stored, either in encrypted form or in original (decrypted) form.

In the retrieving and re-composition stage of the process, the output and additional output strings a to d are transmitted to the central processor 2, where the individual watermarks will be checked on validity. If correct, the individual watermarks are deleted, resulting into the strings a-d:

string a:
11010010001010111100011011101110000100010101
10 . . .

string b:
01011100011011110110101000010100110100011001
01 . . .

string c:
00011110010011101111001000110101000001010010
10 . . .

string d:
10010001111010111011101000010001110111010101
01 . . .

which, bit-by-bit, are summed modulo 2, resulting into a replica of the watermarked first data string as generated by the camera 1:
000000011110000111101111111110001100111110000
00 . . .

The camera watermark can be checked then and, if correct, the watermark can be deleted, resulting into a replica of the first data string:
0111100001110111111110001100111110000000 . . .

It is noted that it may be advantageous in view of security to generate more output strings then actually will be used for re-composition. A method hereto is to generate a number of redundant output strings in the processor, indicated by 2' in FIG. 2, and to label those strings, within those strings themselves or within the processor 2', by an redundancy/relevance code. Only strings having such code and which indicates that that string is essential for recovering the original stringy will be processed in processor 2 in the reconstruction process of the image as described above. For instance, in the above example not three but six decomposition strings are generated, but string d is calculated only using strings a to c (equal to the above example); strings e to g only are redundant "dummies". In this example, the redundancy/relevance code is formed by the first watermark bit. Another, possibly better, option is to register, in the processor 2' register 6, which strings are relevant for recovering a replica of the original string, and which are not.

a:
000001110100100010101111000110111011100001000101
01100 . . .

b: 0000100101110001101111011010100000101001101000110010111
1001011 . . .

c:
00001100011110010011101111100100011010100000101
001101 . . .

d:
0001000101100110111010000111110101010111001011
1010101 . . .

e:
10010111000001001011011000001001111110010100011
011110 . . .

f:
10011011010001011100011010001011111111010110110
001100 . . .

g:
10011111011000000011011000010111000101000111000
101100 . . .

Instead of producing a number of redundant random strings (e-g), another option is to calculate one or more additional output strings from one or more random strings, in the same way as string d was calculated from strings a to c. For instance, first a series of four random strings is generated, followed by a fifth string, which is calculated by summing modulo two the bits of the original string and those of random strings one and three (shorter: string e results from strings a and c). Further, a sixth string f is made, by summing modulo two the bits of (again) the first data string and the random strings (an arbitrary choice) a, c and d (in short: string f results from strings a, c and d). In this way, another redundancy is created, e.g., by the string couples a, c and e respectively a, b, d and f.

A replica of the first data string can be reconstructed from either the first couple of strings a, c and e, or from the second couple of strings a, b, d and f, and in both cases by summing modulo two the respective bits of the strings of the first couple or by summing modulo two the respective bits of all strings of the second couple. Processor 2 needs to register in register 6 which strings belong to respective couples and are able to reproduce together a replica of the original.

Finally, it may be advantageous to make use of different watermarks for downloading and uploading of the output strings respectively. In that case, on downloading the strings to the storage location 3, the processor 2 may assign download watermarks to the output strings, while the storage means 3 may assign, on uploading from the storage location to the processor 2, upload watermarks. The same may apply for the first data string and its reconstructed string.

In order to enable the monitoring apparatus 1 to perform the functions as mentioned above as well as additional functions, the monitoring apparatus 1 can be equipped with several hardware or software modules. FIG. 2 shows:

2—processor substantially enabling the generation of the output strings and the additional output strings as well as the watermarking strings;

2'—selection means as part of the processor that enables redundant strings to be generated, i.e. the selected output strings;
3—storage locations for the output strings not being an integral part of the camera;
3'—storage location(s) for the output strings being an integral part of the camera;
5—event trigger;
6—register to store the relevance of the selected output string to the reconstruction process of the first data string;
7—compression means;
8—encryption means;
9—network communication means;
10—assessment means;

The function of the processor 2 and 2' and register 6 and encryption means 8 has been explained above in detail.

The separate storage of the various data strings, i.e., output strings, additional output strings and/or selected output strings, can be done at or near the camera 1 as well as outside the camera as shown by respectively storage location(s) 3' or 3. As stated before, separate storage not necessarily refers to separate physical locations. The separate storage locations are provided with assessing means 10 in order to determine the access right of a party requesting access to data string stored at a specific storage location. Only if a party is authorized, can this party actually retrieve the data string stored at that specific storage location.

Advantageously, compression of the data strings, applying state of the art compression techniques, is performed by compression means 7. Compressing of the data strings can be done in order to reduce storage capacity at the storage locations and to reduce bandwidth usage if the data strings are to be transmitted over a network.

The monitoring means 1 is preferably supplied with networks communication means 9 in order to enable the transmission of the various output strings to separate storage locations away from the monitor apparatus.

As will be clear to the man skilled in the art, several of the modules can coincide, such as the encryption means that might be part of the processor 2 as well as being a separate module 8. Moreover, the sequence of the modules can be modified, e.g., compression of the data at 7 can also be applied to the data strings before encryption of the data strings has been performed.

The invention claimed is:

1. Apparatus for monitoring a representation of an object, said monitoring apparatus comprising:
   means for converting said representation into a first data string, the first data string containing pixel image data for an entire image of the object;
   processor means, responsive to the first data string, which generates first and second output strings from which said first data string can be reconstructed such that both said first and second output strings are responsive to data for the entire image and are required to reconstruct the first data string and obtain the representation therefrom; and
   means for storing said first and second output strings in separate storage locations, each of said storage locations having differing access rights associated therewith each of first and second parties being granted a corresponding right, consistent with the access rights, to respectively access just the first and second memory locations such that neither one of the first and second parties is able to access both of the memory locations and retrieve both of the first and second output strings and reconstruct the first data string; and
   wherein the processor means, in response to each of the first and second parties individually and respectively accessing the first and second memory locations and collectively retrieving both the first and second output strings there from so as to define first and second accessed output strings, reconstructs the first data string from both the first and second accessed output strings so as to define a reconstructed first data string and generates the representation from the reconstructed first data string.

2. The monitoring apparatus recited in claim 1 wherein the monitoring apparatus is a digital camera.

3. The monitoring apparatus recited in claim 1 wherein the monitoring apparatus is an analog camera, the output of said analog camera is digitized by an analog-digital conversion module so as to produce said first data string.

4. The monitoring apparatus recited in claim 1 further comprising means for combining said first and second output strings with each other and/or with said first data string so as to produce an additional output string.

5. The monitoring apparatus recited in claim 1 further comprising network communication means for transmitting said first and second output strings over a network.

6. The monitoring apparatus recited in claim 5 wherein said storage locations are not part of said monitoring apparatus, and said first and second output strings and/or an additional output string are transmitted over said network communication means to said separate storage locations.

7. The monitoring apparatus recited in claim 1 wherein at least one of the separate storage locations is located at said monitoring apparatus.

8. The monitoring apparatus recited in claim 1 further comprising means to assess access rights of each of the first and second parties requesting retrieval or access to either the first or second output string and/or an additional output string.

9. The monitoring apparatus recited in claim 1 further comprising event triggering means for generating said first and second output strings only if said representation has changed with respect to an earlier version of the representation.

10. The monitoring apparatus recited in claim 1 wherein said generating means generates more than two output strings from the first data string so as to define a group of output strings, and said apparatus further comprises means for selecting various output strings from said group of output strings so as to define selected output strings.

11. The monitoring apparatus recited in claim 10 further comprising means for combining said selected output strings with each other and with said first data string so as to produce an additional output string.

12. The monitoring apparatus recited in claim 11 further comprising means for compressing said first data string, said first and second output strings, the selected output strings and/or said additional output string.

13. The monitoring apparatus recited in claim 11 further comprising means for assigning a watermark string to said first and second output strings, said additional output string and/or a replacement string.

14. The monitoring apparatus recited in claim 11 further comprising means for encrypting said first and second output strings, said additional output string, or the selected output strings before these strings are stored within said separate storage locations.

15. The monitoring apparatus recited in claim 14 wherein said encrypting means uses an encryption key which is a function of identifiers referring to said separate storage locations.

16. The monitoring apparatus recited in claim 11 further comprising means for registering said selected output strings and/or said additional output string.

17. The monitoring apparatus recited in claim 16 wherein said registering means assigns a code to each of said selected output strings and/or said additional output string.

18. The monitoring apparatus recited in claim 1 further comprising means for assigning a watermark string to said first data string.

19. The monitoring apparatus recited in claim 18 wherein said watermark assigning means assigns a watermark string to said first data string and/or said first and second output strings, the watermark having an identifier referring to said monitoring apparatus.

20. The monitoring apparatus recited in claim 19 wherein said identifier comprises a time stamp referring to when said first and second output strings were generated or when said first and second output strings were transmitted to said separate storage locations.

21. The monitoring apparatus recited in claim 18 wherein said watermark string comprises an identifier referring to said separate storage locations.

22. A computer readable media comprising computer program instructions stored thereon which, when executed on a computer system that monitors a representation of an object, cause the computer system to:
  convert said representation into a first data string, the first data string containing pixel image data for an entire image of the object;
  generate first and second output strings from which said first data string can be reconstructed such that both said first and second output strings are responsive to data for the entire image and are required to reconstruct the first data string and obtain the representation therefrom;
  store said first and second output strings in separate storage locations, each of said storage locations having differing access rights associated therewith each of first and second parties being granted a corresponding right, consistent with the access rights, to respectively access just the first and second memory locations such that neither one of the first and second parties is able to access both of the memory locations and retrieve both of the first and second output strings and reconstruct the first data string;
  reconstruct, in response to each of the first and second parties individually and respectively accessing the first and second memory locations and collectively retrieving both the first and second output strings there from so as to define first and second accessed output strings, the first data string from the first and second accessed output strings so as to define a reconstructed first data string; and
  generate the representation from the reconstructed first data string.

23. The computer readable media recited in claim 22 further comprising additional stored computer program instructions which, when executed, cause the computer to combine said first and second output strings with each other and/or with said first data string in order to produce an additional output string.

24. The computer readable media recited in claim 22 further comprising additional stored computer program instructions which, when executed, cause the computer to generate more than two output strings from the first data string so as to define a group of output strings, and select various output strings from said group of output strings so as to define selected output strings.

25. The computer readable media recited in claim 24 further comprising additional stored computer program instructions which, when executed, cause the computer to combine said selected output strings with each other and first data string to obtain in order to produce an additional output string.

26. The computer readable media recited in claim 25 further comprising additional stored computer program instructions which, when executed, cause the computer to compress said first data string, said first and second output strings, said additional output string and/or said selected output strings.

27. The computer readable media recited in claim 25 further comprising additional stored computer program instructions which, when executed, cause the computer to encrypt said first and second output strings, said additional output string and/or the selected output strings.

28. The computer readable media recited in claim 25 further comprising stored additional computer program instructions which, when executed, cause the computer to assign a watermark to said first data string, said first and second output strings, said additional output string and/or said selected output strings.

29. The computer readable media recited in claim 28 wherein said watermark comprises an identifier referring to monitoring apparatus, a time stamp referring to when said first and second output strings are generated or said first and second output strings are transmitted to said separate storage locations, or an identifier referring to said storage locations.

30. A data communication network comprising:
  monitoring apparatus for monitoring a representation of an object, wherein the monitoring apparatus comprises:
    means for converting said representation into a first data string, the first data string containing pixel image data for an entire image of the object;
    processor means, responsive to the first data string, which generates first and second output strings from which said first data string can be reconstructed such that both said first and second output strings are responsive to data for the entire image and are required to reconstruct the first data string and obtain the representation therefrom; and
    means for storing said first and second output strings in separate storage locations, each of said storage locations having differing access rights associated therewith each of first and second parties being granted a corresponding right, consistent with the access rights, to respectively access just the first and second memory locations such that neither one of the first and second parties is able to access both of the memory locations and retrieve both of the first and second output strings and reconstruct the first data string; and
    wherein the processor means, in response to each of the first and second parties individually and respectively accessing the first and second memory locations and collectively retrieving both the first and second output strings there from so as to define first and second accessed output strings, reconstructs the first data string from both the first and second accessed output strings so as to define a reconstructed first data string and generates the representation from the reconstructed first data string.

* * * * *